ABSTRACT# United States Patent [19]

Fett

[11] Patent Number: 5,042,191
[45] Date of Patent: Aug. 27, 1991

[54] CLIP FOR ATTACHING A FISHING LURE AND THE LIKE

[76] Inventor: Terry A. Fett, 4901 Roper Mountain Rd., Apt 271, Greenville, S.C. 29615

[21] Appl. No.: 392,031

[22] Filed: Aug. 10, 1989

[51] Int. Cl.⁵ ............................................. A01K 91/04
[52] U.S. Cl. ..................................... 43/44.83; 24/552
[58] Field of Search .................. 43/43.1, 44.83, 44.86, 43/44.92, 44.95; 24/237, 552, 553, 555

[56] References Cited

U.S. PATENT DOCUMENTS

| 159,403 | 2/1875 | Foster | 24/237 |
| 733,921 | 7/1903 | Sibley | 24/237 |
| 872,934 | 12/1907 | Haug | 24/237 |
| 1,892,678 | 1/1933 | McIntyre | 24/237 |
| 2,484,449 | 10/1949 | Fetterman | 256/57 |
| 2,810,176 | 10/1957 | Gaafar | 24/237 |
| 3,241,201 | 3/1966 | Chester | 24/73 |
| 3,333,307 | 8/1967 | Wheeler | 24/237 |
| 3,913,185 | 10/1975 | James | 43/42.49 |
| 3,974,587 | 8/1976 | Levake | 43/42.19 |
| 4,819,305 | 4/1989 | Ooe | 43/44.83 |

Primary Examiner—Kurt Rowan
Attorney, Agent, or Firm—Bailey & Hardaway

[57] ABSTRACT

A clip is illustrated for attaching a fiching lure to a line which includes a line attaching loop and a pair of elongated diverging tension bars extending symetrically from free ends of the loop and with the tension bars having a pair of inwardly converging bars carried thereby with overlapping end portions for holding a pair of overlapping loops which are separable by depressing the tension bars between a thumb and forefinger for changing or replacing a fishing lure.

7 Claims, 1 Drawing Sheet

CLIP FOR ATTACHING A FISHING LURE AND THE LIKE

BACKGROUND OF THE INVENTION

This invention relates to a unitary wire clip for attaching a fishing lure and the like to a fishing line by manually compressing elongated torsion bars.

A swivel is illustrated for use with fishing equipment in U.S. Pat. No. 3,241,201 wherein a ball carries a shank provided with a loop adjacent one end and positioning a pair of opposed arcuate depressible loops against the ball and with overlapping converging members carrying a pair of opposed ends. U.S. Pat. No. 1,882,678 discloses an attaching fixture having a pair of opposed attaching end members carried by one end of each of a pair of torsion bars which are joined by a coiled member.

The following U.S. Patents are illustrative of the state-of-the-art: U.S. Pat. Nos. 629,224, 868,004, 872,934, 1,182,471, 1,250,500, 313,372, 2,267,558, 2,385,274, 2,546,303, 2,871,540, 3,105,278, 4,759,103 and 4,777,950.

Accordingly, it is an important object of this invention to provide a clip having single, line attaching loop member with a pair of elongated substantially straight torsion bars carried symmetrically on opposite free ends of the loop all extending in the same flat plane. Also, in this flat plane a pair of inwardly extending converging bars are provided for carrying inwardly diverging bars with opposed open loops which are resiliently urged together by the action of the torsion bars with the overlapping bar members carried at a free end of the inwardly diverging members carried by the torsion bars.

Another important object of the invention is to provide a single line loop which would not only permit attachment of the line but would also allow for the use of a swivel. The single bend provides a minimum of cross sectional area so as not to impede the passage of the lure and the attachment through the water and to minimize the disturbance of the water. More importantly, perhaps, is the stable attachment provided by the line loop which would not tend to loosen a knot attached as a coil or double loop would due to repeated flexing which may cause the line to loosen.

SUMMARY OF THE INVENTION

It has been found that an integral resilient metallic wire clip may be provided with a straight run on elongated torsion bars for the purpose of streamlining a fish clip. The straight run also helps the user to open the fish clip but allows for even distribution of finger contact along the length of the torsion bar. This is critical when considering the fact that the purpose of the fish clip is to allow for the easiest and simplest approach to changing a lure without constantly tying knots, thus allowing for more fishing time as well as decreasing the expense of purchasing fishing line, reducing the chances of dropping expensive lures in the lake or river and giving lures freedom of movement for maximum designed performance. Mechanically, a straight line will allow for more strength and reduce end flex when the fish clip is in a stressful situation while in use.

An attaching loop member or claw is provided at the other end of the clip and is carried by a pair of inwardly converging members carried on the torsion bars.

The clip or claw is formed by using two circular members. A circle allows for easy placement and removal of the line attaching eye of a lure. The claw is turned 90 degrees in relation to the horizontal plane of the two main torsion bars. The claw allows the lure freedom of movement by design. It is circular or as close to circular as possible considering manufacturing tolerances. The circular design allows for easy attachment and removal or a lure. A circular claw also spreads a load along its entire axis when under stress. A design utilizing a sharp singular bend would transmit the load to that location alone.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein.

DESCRIPTION OF A PREFERRED EMBODIMENT

A clip constructed integrally of resilient metallic wire for attaching a fishing lure to a line includes an arcuate line attaching loop having a single bend A with free ends spaced closely adjacent each other and being substantially equidistant on opposite side of a center line of the loop. A pair of substantially straight elongated tension bars B, one tension bar extending outwardly from each free end of said loop. The tension bars diverge outwardly away from each other generally throughout their length. A pair of inwardly converging bars C, one of said converging bars extending inwardly from each free end of the tension bars has a free end opposite said arcuate line attaching loop. Inwardly converging bars have overlapping end portions remote from tension bars. A pair of overlapping loops D each carried by a respective overlapping end portion of the inwardly converging bars extend in opposed relation in a plane substantially normal to a plane of said line attaching loop and torsion bars, and the overlapping loops are resiliently urged toward each other in opposed relation.

Figure 1:
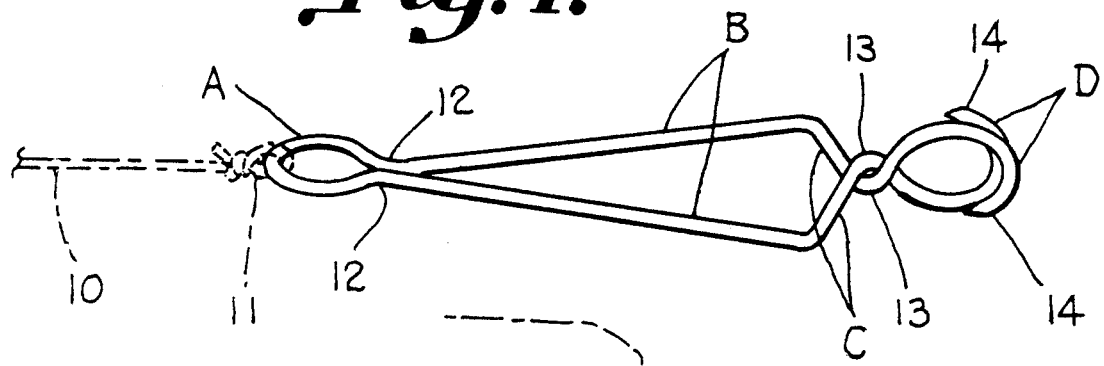
FIG. 1 is a perspective view illustrating a clip constructed integrally of resilient wire like material for a single loop on one end carrying straight diverging torsion bars for positioning loop members in resiliently opposed relation on overlapping bars carried opposite the line attaching loop.
Figure 2:
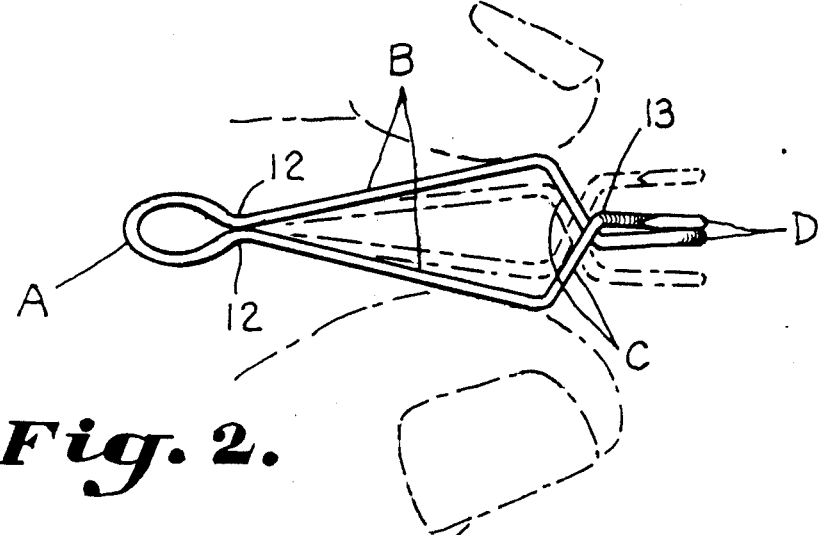
FIG. 2 is a plan view illustrating the clip being depressed between the thumb and forefinger of a user for changing a lure.

The line 10 in FIG. 1 is illustrated as being attached by a knot 11 to the loop A. The loop A is preferably generally elongated as illustrated. The loop has free ends which are closely adjacent each other and provide opposed curved connection portions 12 which are in contact or otherwise fairly closely adjacent each other so that may bear against each other when the torsion bars B are depressed. Each of the converging bars B are depressed. Each of the converging members C have overlapping portions 13 so as to provide a loop for attaching the lure and the like. The loop D preferably includes curved or partially circular members 14 which are resiliently biased toward each other by the action of the torsion bars B and the loop A. The overlapping portion 13 as illustrated permit the loop forming members D to remain closed to confine a lure and the like thereon.

The subject devices may preferably be made from a stainless steel wire of various sizes depending on its use. Other suitable resilient metallic or plastic material may also be used. Production may require a four slide press with torsion twist capabilities. This would then facilitate one piece construction. Manufacturing may utilize a coil spring steel in straight line configuration. The press would then begin forming the ends, then begin the formation of the loop and torsion bars. Final forming would consist of a torsional twist of the ends to result in completion of the clip with resilient urging of the ends toward each other in opposed relation at all times through the torsion bars with forces applied thereto by the loop.

Figure 3:
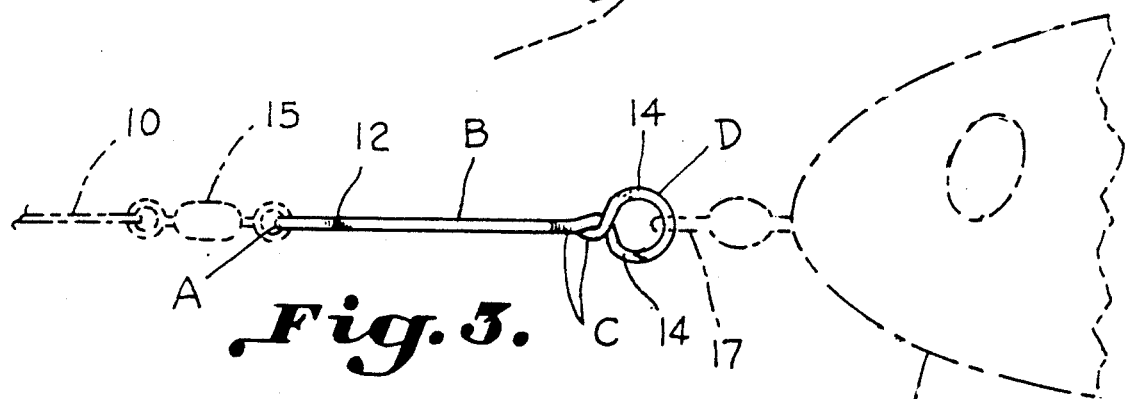
FIG. 3 is a side elevation of a clip constructed in accordance with the invention illustrating the clip as being attached to a line through a swivel on one end and the lure being affixed on the other.

FIG. 3 includes the use of a conventional swivel 15 for connecting the clip and the line 10. The lure is illustrated in broken lines at 16 and attached to the loop D. The lure has a loop 17 for direct engagement to the loop D.

Figure 4:
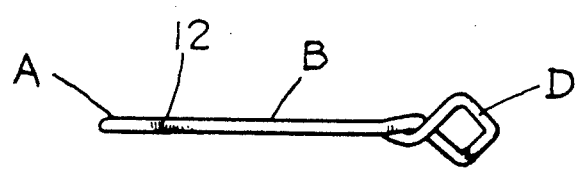
FIG. 4 shows another configuration of the loops.

The respective loop members may be constructed in any other suitable configuration and may be oval or even triangular or rectangular in general configuration as illustrated in FIG. 4.

While a preferred embodiment of the invention has been described using specific terms, such description is for illustrative purposes only, and it is to be understood that changes and variations may be made without departing from the spirit or scope of the following claims.

What is claimed is:

1. A clip constructed integrally of resilient metallic wire for attaching a fishing lure to a line comprising:
   an arcuate line attaching loop consisting of a single bend on one end of said clip and having free ends spaced closely adjacent each other and being substantially equidistant on opposite sides of the center line of the loop in substantially the same plane;
   a pair of substantially straight elongated tension bars, one tension bar extending outwardly from an abutment formed at each free end of the said loop in the same plane as said loop;
   said tension bars diverging outwardly away from each other generally throughout their length urging said abutments into contact when compressed;
   a pair of inwardly converging bars, one of said converging bars extending inwardly from each free end of said tension bars and having a free end opposite said arcuate line attaching loop;
   said inwardly converging bars having overlapping end portions remote from tension bars; and
   a pair of overlapping loops each carried by a respective overlapping end portion of said inwardly converging bars opposite said single bend extending in opposed relation in a plane substantially normal to said plane of said line attaching loop and tension bars, opened when said tension bars are compressed.

2. The structure set forth in claim 1 wherein said loops are resiliently urged toward each other.

3. A clip constructed integrally of resilient material for attaching a fishing lure to a line comprising:
   an arcuate line attaching loop consisting entirely of a single wire disposed in a single plane on one end of said clip and having free ends spaced closely adjacent each other;
   a pair of substantially straight elongated tension bars, one tension bar extending outwardly from each of said free ends in the same plane as said loop;
   said tension bars diverging outwardly away from each other generally throughout their length;
   an abutment adjacent each free end of said loop from which said bars extend outwardly, engageable when said bars are compressed;
   a pair of inwardly converging bars, one of said converging bars extending inwardly from each free end of said tension bars and having a free end opposite said arcuate line attaching loop;
   said inwardly converging bars having overlapping end portions remote from tension bars; and
   a pair of overlapping loops each carried by a respective overlapping end portion of said inwardly converging bars extending in opposed relation in a plane substantially normal to the plane of said line attaching loop and tension, bars opened by compressing said tension bars.

4. A clip integrally of resilient metallic wire for attaching a fishing lure to a line comprising:
   an arcuate line attaching loop consisting of a single band on one end of said clip and having free ends spaced closely adjacent each other and being substantially equidistant on opposite sides of the center line of the loop in substantially the same plane;
   a pair of elongated tension bars, one tension bar extending outwardly from an abutment formed at each free end of said loop in the same plane as said loop urging said abutments into contact when compressed;
   said tension bars diverging outwardly away from each other;
   a pair of inwardly converging bars, one of said converging bars extending inwardly from each of said tension bars and having a free end opposite said arcuate line attaching loop;
   said inwardly converging bars having overlapping end portions remote from tension bars; and
   a pair of overlapping loops forming together with said overlapping end portions a substantially complete circle, each loop carried by a respective overlapping end portion of said inwardly converging bars extending in opposed relation in a plane substantially normal to a plane of said line attaching loop and tension bars, opened when said tension bars are compressed.

5. A clip constructed integrally of resilient metallic wire for attaching a fishing lure to a line comprising:
   a line attaching loop consisting of a single bend on end of said clip and having free ends spaced closely adjacent each other and being substantially equidistant on opposite sides of the center line of the loop in substantially the same plane;
   a pair of substantially straight elongated tension bars, one tension bar extending outwardly from an abutment formed at each free end of said loop;
   said tension bars diverging outwardly away from each other generally throughout their length urging said abutments into contact when compressed;
   a pair of substantially straight inwardly converging bars, one of said converging bars extending inwardly from each free end of said tension bars and having a free end opposite said arcuate line attaching loop in the same plane as said loop;

said inwardly converging bars having overlapping end portions remote from said tension bars; and a pair of overlapping loops each carried by a respective overlapping end portion of said inwardly converging bars extending in opposed relation in a plane substantially normal to the plane of said line attaching loop, opening when said tension bars are compressed.

6. The structure set forth in claim 5 wherein said line attaching loop is arcuate.

7. The structure set forth in claim 5 wherein said line attaching loop is triangular.

* * * * *